(12) United States Patent
Jensen

(10) Patent No.: US 6,456,784 B1
(45) Date of Patent: Sep. 24, 2002

(54) CIRCUIT ARRANGEMENT FOR STARTING A DC MOTOR

(75) Inventor: Jens Herman Jensen, Ulfborg (DK)

(73) Assignees: Sörensen Hydraulik, Zweigniederlassung, Ulfborg, Delforg (DK); Filial af Sörensen Hydraulik GmbH, Tyskland (DE)

( * ) Notice: Subject to any disclaimer, the term of this patent is extended or adjusted under 35 U.S.C. 154(b) by 0 days.

(21) Appl. No.: 09/569,512

(22) Filed: May 12, 2000

(30) Foreign Application Priority Data

Apr. 20, 2000 (EP) .............................. 00108673

(51) Int. Cl.[7] ................................ H02P 5/00
(52) U.S. Cl. ................. 388/800; 388/801; 318/248; 318/252
(58) Field of Search .................. 318/138, 139, 318/248, 373, 257, 246, 252; 290/31, 46, 38 R; 123/179 B; 388/801, 800

(56) References Cited

U.S. PATENT DOCUMENTS

| | | | | |
|---|---|---|---|---|
| 3,735,227 A | * | 5/1973 | Gill | |
| 3,911,342 A | * | 10/1975 | Herwig | |
| 4,122,354 A | * | 10/1978 | Howland | |
| 4,731,543 A | * | 3/1988 | Buetemeister et al. | |
| 5,136,219 A | * | 8/1992 | Takahashi et al. | |
| 5,156,232 A | * | 10/1992 | Muroya et al. | |
| 5,410,231 A | * | 4/1995 | Yang | |
| 5,453,673 A | * | 9/1995 | Yang | |
| 5,569,992 A | * | 10/1996 | Yang | |
| 5,875,281 A | * | 2/1999 | Thexton et al. | |
| 5,898,280 A | * | 4/1999 | Yang | |

FOREIGN PATENT DOCUMENTS

EP 0046435 A1 * 2/1982

* cited by examiner

Primary Examiner—Marlon T. Fletcher
(74) Attorney, Agent, or Firm—Klaus J. Bach

(57) ABSTRACT

In a circuit arrangement for starting a DC motor comprising at least one field winding, particularly for switching on a DC motor for driving a hydraulic fluid pump for operating hydraulic actuators of a vehicle loading platform system, means are provided for switching on at least one field winding and means activatable by the switching on of the at least one field winding for fully activating and starting the DC motor.

6 Claims, 2 Drawing Sheets

CIRCUIT ARRANGEMENT FOR STARTING A DC MOTOR

BACKGROUND OF THE INVENTION

The invention resides in a circuit arrangement for starting a DC motor, which includes at least one field coil, particularly for switching on a DC motor driving a hydraulic pump for the operation of hydraulic lift and/or tilt actuators of loading platform systems of vehicles.

DC motors are used in almost all industrial fields, particularly in areas where a low voltage DC power supply is present such as in motor vehicles which are not connected to a power supply net. Such vehicles are ships, airplanes and land vehicles, particularly trucks.

It is known that trucks may be provided with so-called loading platform systems in order to be able to lift for example a load from ground level to the level of a loading bed of a truck and vice versa. Certain loading platform systems are not only capable of lifting a loading platform from ground level to the level of the loading bed of a truck, but they are also capable of tilting the loading platform from a horizontal to a vertical position so as to form an end wall of the loading bed of a truck when the truck is moving. The lifting and lowering and the tilting of the loading platform from a vertical to a horizontal position and vice versa is achieved by so-called lift actuators and, respectively, tilt actuators, which always comprise piston-cylinder arrangements, in which a pressurized hydraulic medium causes the movement of the piston or the pistons. The pressure of this hydraulic medium is generated by one or several hydraulic pumps which are driven by DC motors and which are energized by the electrical power supply system of the truck, for example, a 12 volt or 24 volt power supply system. In order to be able to perform the lifting and the tilting functions, particularly the lifting functions, under a maximum load, those DC motors need to be relatively powerful so that they can drive the respective hydraulic pumps and generate the needed pressure of the hydraulic medium.

Typically, these DC motors have a normal power output of 3 kW. If such a DC motor is operated from a 12-volt vehicle power supply at the given nominal power output, the current flow is about 250 Ampere. Switches, which are capable of switching such currents and which need to be operative over a long period, must be relatively large and therefore cannot be integrated into an electromechanical and/or electronic control unit used for the control and supervision of the functions of a loading platform system. Therefore, a relay is generally provided, which is operated by the control unit as described before, and which is capable to switch the high currents by way of high power switches.

The relay for switching the DC motor is mounted near, or on, the DC motor and is connected electrically to the motor as well as to the control unit.

With the rough environment to which the loading platform systems are exposed, such as rain, snow, dust, exhaust gases and also rough treatment by the operators, the relays for switching the power supply to the DC motor operating the hydraulic fluid pump has been found to be a weak link which often results in malfunctions or even total failure of the system. The relay needs to be encapsulated for protection of the rough environment if operational reliability is to be ensured. Furthermore, the separate mounting of the relay on the DC motor or its arrangement near the motor and the wiring with the motor and the control unit involve substantial expenses as the equipment requires special handling during manufacture and installation of the loading platform systems.

It is therefore the object of the present invention to provide a circuit arrangement for the switching of a DC motor of the type described above with which a separate mounting of a relay for the energization of the DC motor is not necessary and the operational reliability of the motor is essentially independent of weather and environmental conditions. As a result, a DC motor with its motor control arrangement can be realized at relatively low costs.

SUMMARY OF THE INVENTION

In a circuit arrangement for starting a DC motor comprising at least one field winding, particularly for switching on a DC motor for driving a hydraulic fluid pump for operating hydraulic actuators of a vehicle loading platform system, means are provided for switching on at least one field winding and means which can be activated by the switching on of the at least one field winding for fully activating and starting the DC motor.

The advantage of the arrangement according to the invention essentially resides in the fact that the switching means itself can be connected with one pole firmly to the power supply of the vehicle by way of a suitably dimensioned electrical conductor. No relay is needed, no relay needs to be mounted to the DC motor or nearby and no installation work is required for establishing the electrical connections between the relay, the DC motor, the vehicle power supply and the control unit.

DC motors can be designed so that the field windings or coils are arranged in series with the armature of the DC motor. Such a motor is called a series-wound motor. But it is also possible to arrange the field windings in parallel with the armature. Such a motor is called a shunt-wound electric motor. Series-wound motors and shunt-wound motors have certain properties that make a particular DC motor type more suitable for certain drive applications. It is therefore advantageous for certain applications to provide the field winding with at least one series exciter winding which causes the starting of the DC motor according to the invention. However, it may also be advantageous to provide the field windings as at least one shunt winding which then causes the switching on of the DC motor in accordance with the invention.

From the state of the art, there are in addition to series-exciter wound DC motors and shunt-wound DC motors, also so-called compound-wound motors, which include at least one series exciter winding and at least one shunt exciter winding. For certain applications, these motors have advantages over pure series-wound motors or pure shunt-wound motors. Also, compound-wound motors can be advantageously operated with the circuit arrangement according to the invention. This is done in a way that the shunt winding is energized independently of the series exciter winding wherein, by energization of the shunt winding, the series exciter winding may be switched on.

The advantage of this arrangement resides essentially in the fact that the shunt exciter winding, which is arranged parallel to the armature of the DC motor, takes a lower current than the series exciter winding, which is arranged in series with the armature. The current flow through the shunt winding is essentially constant independently of the motor speed. As a result, the shunt exciter winding can be directly switched on and off by the control unit for the loading platform system referred to earlier, without the need for a relay. When the shunt exciter winding is switched on by the control unit when needed for switching on the DC motor, the series exciter winding is subsequently switched on by the shunt winding by way of suitable means.: That is, also the series exciter winding is energized after the control unit energizes the shunt exciter winding so that then the DC motor becomes normally operative.

However, it may also be advantageous if the series exciter winding can be switched on independently of the shunt winding such that the shunt winding is switched on by the energization of the series exciter winding. This last-mentioned variation of the circuit arrangement may be advantageous for certain applications, for example, for design reasons depending on the arrangement of the series exciter winding or, respectively, the shunt winding in the motor housing.

In another advantageous embodiment of the circuit arrangement, the magnetic field generated by the energization of the field windings may be used for the switching on of the DC motor. To this end, the DC motor may include switch means or other effective means, which are activated by the magnetic field and cause the switching on of the DC motor. In this respect, the field winding may serve also as the armature of a relay for switching on the motor.

In still another advantageous embodiment, the field winding may be switched on by bringing at least one of the carbon brushes into contact with the collector of the DC motor. By switching on the field winding, which then generates a magnetic field and actuates a mechanism by way of which at least one of the carbon brushes is moved into contact with the collector of the rotor, the power supply to the armature can be established and the DC motor becomes operative.

If the DC motor is a compound motor and if the one field winding is formed by the shunt-wound winding and this winding is energized, the electric circuit to the series-wound winding can be closed by way of the armature in the same way and, consequently, the compound-wound DC motor is functional.

In a further advantageous embodiment of the circuit arrangement, the field winding is switchable by an axial movement of the rotor. In this case, a switch is operated by the axial movement of the rotor, whereby the motor is energized. The axial movement of the rotor may be achieved by a suitable arrangement of the field winding relative to the rotor, that is, by a particular position of the field winding relative to the rotor during operation of the motor. In its rest position, when it does not rotate, the rotor may, for example, be moved by the force of a spring axially out of its normal axial operating position to a rest position and, in this way, the DC motor could be de-energized by an appropriate control of the field winding by the control unit, that is by switching off the field winding.

Preferably, the switching means which are controlled by the field winding for energizing the DC motor are disposed at least partially in the housing of the DC motor so that the DC motor is designed to include the switching arrangement as an integral component. With this arrangement, the DC motors do not need to be modified or changed in order to provide them with the switching arrangement so that, besides a connection to the onboard power supply and a switching unit such as a control unit, no control circuitry is needed for the operation of the loading platform system referred to earlier.

An embodiment of the invention will now be described with reference to the accompanying schematic drawings.

DESCRIPTION OF A PREFERRED EMBODIMENT

Figure 1:
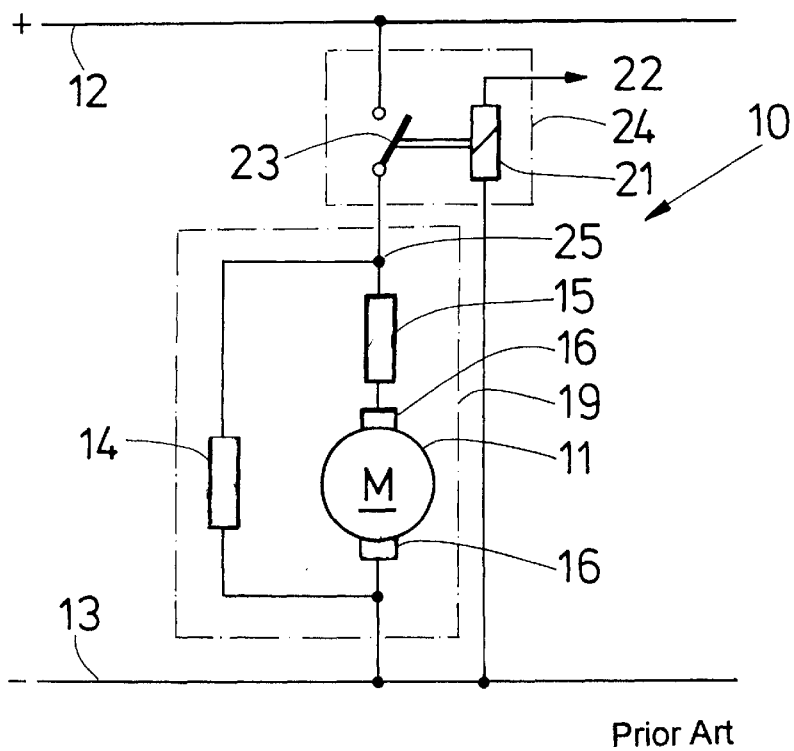
FIG. 1 shows a control circuit in connection with a conventional DC motor in the form of a compound-wound motor.

First, reference is made to FIG. 1 in which the basic circuit arrangement 10 is shown as it has been used so far in connection with compound wound motors 11 and also in connection with other DC motors as used for driving hydraulic fluid pumps of loading platform systems mounted on vehicles. The power supply 12, 13 is for example the electric onboard power supply system of the vehicle whose voltage is generally 12 or 24 volts. Other power supply voltages are of course possible. A relay 21 is provided which is connected to a control circuit or a switching arrangement 22 so as to be activated or deactivated thereby for switching the motor 11 by way of the switch 23. The switched voltage, here the positive supply voltage 12, is supplied to the DC motor 11 which is a compound-wound DC motor. A compound-wound motor 11 includes a series-exciter winding 15 arranged in series with the armature and a shunt-exciter winding 14 arranged in parallel with the armature and the series exciter winding 15. The dash-dotted line 19 indicates the housing as it usually surrounds the DC motor 11 in a known manner.

The conventional circuit arrangement 10 comprises the relay 21 as well as the switch 23, which is symbolically indicated by the dash-dotted line 24.

Figure 2:
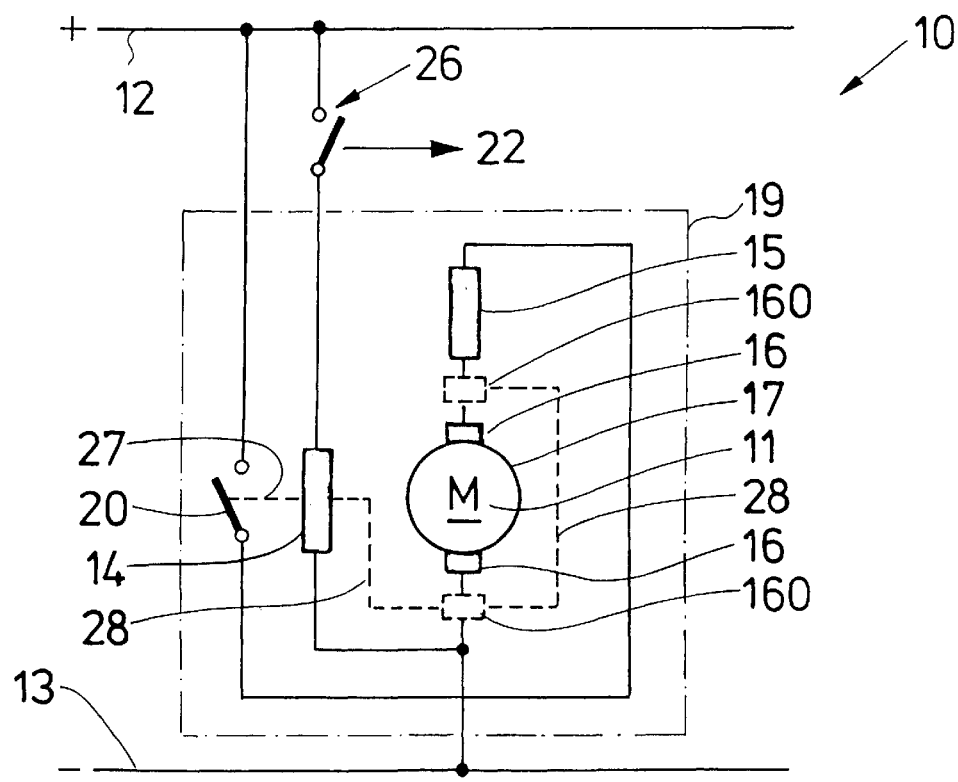
FIG. 2 shows a particular embodiment of the circuit arrangement according to the invention in which, as a result of the energization of the shunt-wound coil, either a switch is operated or a carbon brush or both brushes are moved into contact with the commutator in order to energize the series-wound coil.

The switch arrangement 10 according to the invention as apparent from FIG. 2 is integrated into the housing 19 of the DC motor 11. Other than in the representation of FIG. 1, FIG. 2 shows an arrangement, wherein the connection joint 25, with which, in FIG. 1, the shunt winding 14 is connected with the series exciter winding 15 or is connected to a pole of the switch 23, is not present. Rather, the shunt-wound coil 14 connection extends separately through the housing 19 to one pole of a switch 26 whose other pole is connected to the positive lead of the power supply 12. A control unit 22 operates the switch 26. It may be a normal switch or a relay, which may be part of the control unit 22.

The series exciter winding 15, which in FIG. 1 is connected with one pole also to the connection 25, leads, in the arrangement of FIG. 2, to one pole of an actuating or switch means 20, which is shown in FIG. 2 symbolically as a switch. The other pole of the actuating or switch means 20 is connected to the positive power supply line 12. In a first embodiment of the control arrangement 10 in accordance with the invention, a magnetic field is generated which, in addition to its effects for operating the DC motor 11, actuates also the actuating or switch means 20 when the shunt exciter winding 14 is energized by the control unit 22—see the dashed line 27 from the shunt-wound winding 14. If then, after energization of the shunt winding 14, the actuating or switch means 20 is activated, that is in the present case, it is closed, the positive power supply line is also connected to the series exciter winding 15 so that the DC motor 11 is fully energized and begins operation. The current flow through the series exciter winding 15 is much greater than the essentially constant current flow through the shunt winding 14. A startup relay 21 for the energization of the DC motor as shown in the circuit arrangement of FIG. 1 is not needed for the arrangement as shown in FIG. 2.

A second embodiment of the circuit arrangement 10 for controlling the DC motor 11 is also apparent from FIG. 2. It is indicated by the dashed line 28. In this case, at least one of the carbon brushes 16, which, in an inoperative state of the DC motor 11, is removed from the collector 17 (indicated by a circle), is movably supported by suitable guide means so that it (or both brushes) can be moved into contact with the collector 17. The magnetic field generated by the energization of the shunt winding 14 is utilized to initiate the movement of the carbon brush 16 (or of both brushes 16, 160) into contact with the collector 17. Then, power is supplied also to the series-exciter winding 15 so that the DC motor 11 becomes fully operative.

If the control unit 22 opens the switch 26, the magnetic field of the shunt winding 14 collapses whereby the carbon brush 16 and, respectively, the brush 160 are retracted to the position shown in FIG. 2 by dashed lines in which they are disengaged from the collector 17. The DC motor 11 is then fully de-energized and stops.

Figure 3:
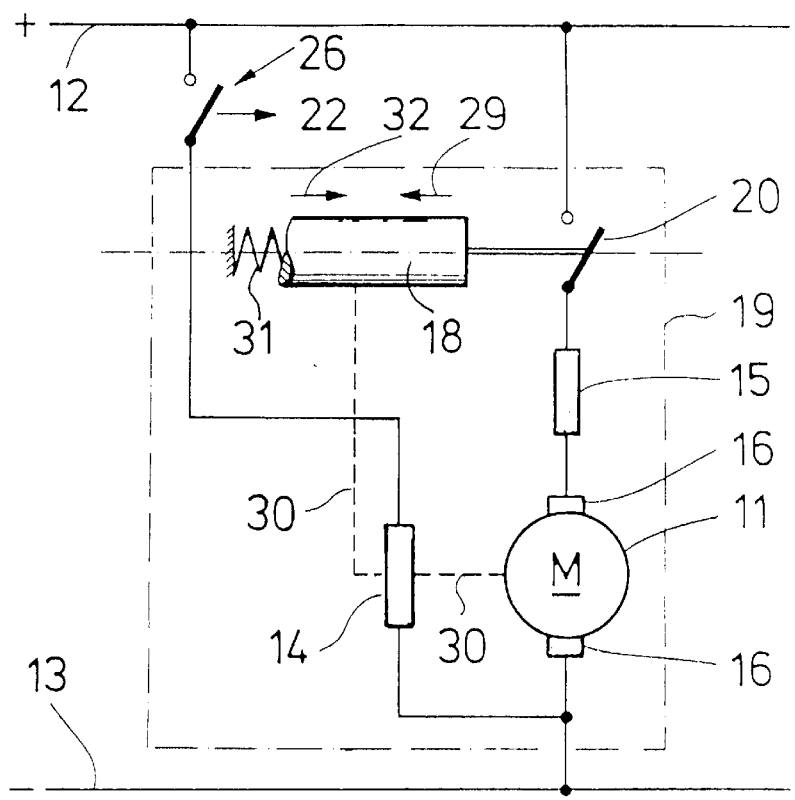
FIG. 3 shows a variation of the embodiment according to FIG. 2, wherein energization of the shunt-wound coil provides for a controlled axial movement of the rotor resulting in energization of the series-wound coil.

FIG. 3 shows another embodiment of the control arrangement 10, which, in this case, is also fully incorporated into the DC motor 11 or the housing 19 surrounding the DC motor 11. In this case, the series-exciter winding 15 is energized after the switch 26 is switched on and again a magnetic field is generated by the shunt winding 14. The magnetic field of the shunt-wound coil moves the rotor 18 (shown schematically) in the direction of the arrow 29. The rotor is coupled to the actuating or switch means 20 in a suitable manner so that the switch 20 is closed and power is supplied to the series-exciter winding 15 from the positive power supply line 12. The DC motor 11 is then fully operative. The dashed line 30 symbolizes the effective connection between the shunt-exciter winding 14 and the rotor 18. If the switch 26 is opened by an appropriate control action of the control unit 22, the rotor is returned to its original position by the force of the spring 37 whereby the switch 20 is opened and the series-exciter winding 15 is de-energized.

Figure 4:
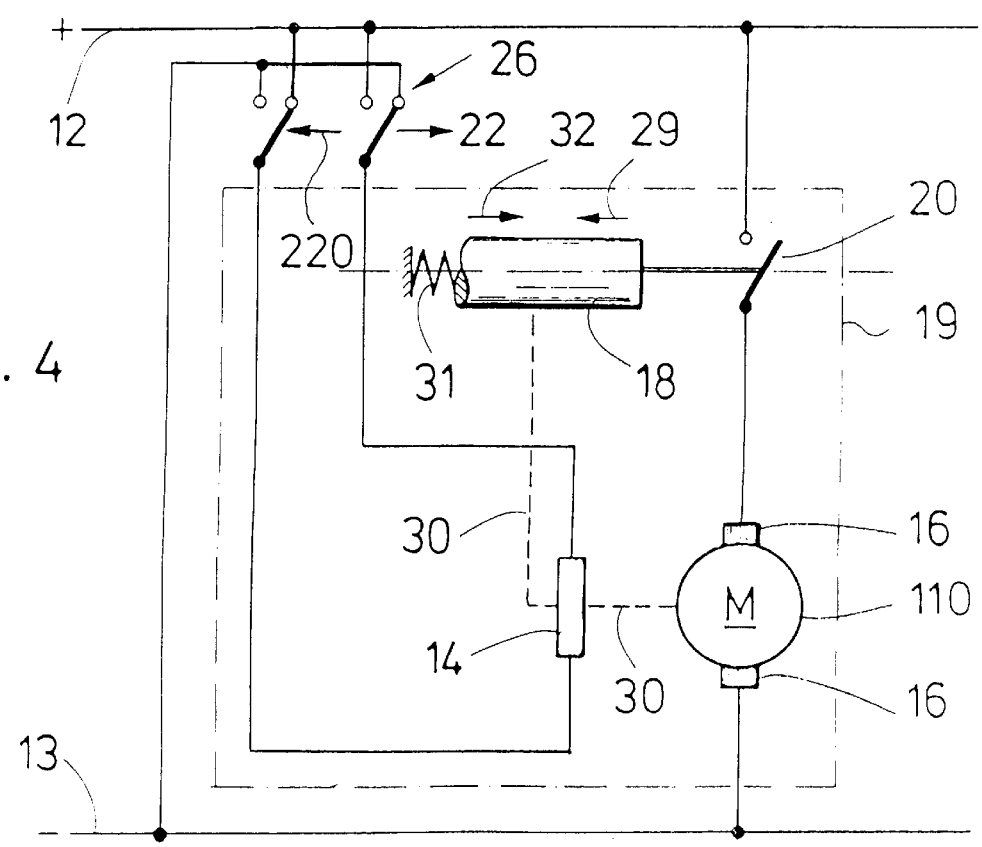
FIG. 4 shows a circuit arrangement according to FIG. 3, wherein the DC motor is in the form of shunt-wound motor.

FIG. 4 shows a circuit arrangement 10, which is similar to that of FIG. 3. In this case, however, the DC motor is a shunt-wound motor 110, that is, it does not include a series exciter winding. The control arrangement is the same as that described in connection with the FIG. 3. The arrangement permits a simple reversal of the direction of rotation of the DC motor. By activation of the switch 26 by control signal 22, the DC motor rotates in one direction. Activation of the switch 26 by a control signal 220 causes the DC motor 11 to rotate in the opposite direction as the current flow direction through the shunt-exciter winding 14 is reversed. All other functions as described in connection with FIG. 3 remain unchanged.

What is claimed is:

1. A circuit arrangement for starting a DC motor, comprising a shunt and a series exciter winding, particularly for switching on a DC motor for driving a hydraulic fluid pump for operating hydraulic lift and tilt actuators of loading platform systems of vehicles, said motor including means for switching on one of said shunt and exciter windings and switch means activated by the energization of said one of said shunt and series exciter windings for energizing also the other of said shunt and series exciter windings for fully activating and starting said DC motor.

2. A circuit arrangement according to claim 1, wherein said winding, which is first switched on is the series exciter winding by the switching on of the shunt winding.

3. A circuit arrangement according to claim 1, wherein said winding which is first switched on is the series exciter winding and the shunt winding is energized by the switching on of the series exciter winding.

4. A circuit arrangement according to claim 1, wherein said DC motor includes a commutator and at least one carbon brush which is movable relative to said commutator and means are provided for moving said at least one carbon brush into contact with said commutator by energizing one of said shunt and said series exciter windings.

5. A circuit arrangement according to claim 1, wherein said DC motor includes a rotor which is axially movably supported and switching means are provided so as to be operable by an axial movement of said rotor for switching on said DC motor, said switching means being operable by energization of one of said shunt and said series exciter.

6. A circuit arrangement according to claim 1, wherein said switch means activated by the energization of the at least one of said shunt and said series exciter windings for fully activating and starting said DC motor are contained in the housing of said DC motor.

* * * * *